United States Patent [19]

Kay

[11] Patent Number: 5,491,675
[45] Date of Patent: Feb. 13, 1996

[54] SINGLE RETURN PATH ORTHOGONALLY-ARRANGED OPTICAL FOCUS AND TRACKING SENSOR SYSTEM

[75] Inventor: David B. Kay, Rochester, N.Y.

[73] Assignee: Eastman Kodak Company, Rochester, N.Y.

[21] Appl. No.: 259,655

[22] Filed: Jun. 14, 1994

[51] Int. Cl.$^6$ .................................................. G11B 7/085
[52] U.S. Cl. ..................................... 369/44.23; 369/44.14; 369/112; 369/44.41
[58] Field of Search ........................... 369/44.41, 44.42, 369/44.37, 44.14, 44.23, 112, 103, 109, 110, 44.12; 250/201.5

[56] References Cited

U.S. PATENT DOCUMENTS

| | | | |
|---|---|---|---|
| 4,712,205 | 12/1987 | Smid et al. | 365/112 |
| 4,945,529 | 7/1990 | Ono et al. | 369/44.12 X |
| 5,066,138 | 11/1991 | Toide et al. | 369/44.12 X |
| 5,128,914 | 7/1992 | Kurata et al. | 369/44.37 |
| 5,161,139 | 11/1992 | Inoue et al. | 369/112 X |

FOREIGN PATENT DOCUMENTS

| | | | |
|---|---|---|---|
| 0177108A1 | 4/1986 | European Pat. Off. | |
| 0298721 | 11/1993 | Japan | 369/103 |

OTHER PUBLICATIONS

R. Katayama, et al., "Multi–beam Magneto–Optical Disk Drive for Parallel Read/Write Operation", SPIE Proceedings, vol. 1078, pp. 98–104, Optical Data Storage Topical Meeting, Jan. 17–19, 1989.

M. R. Latta, et al., "Effect of Track Crossing on Focus Servo Signals: Feedthrough", SPIE Proceedings, vol. 1663, Optical Data Storage, pp. 157–163, 1992.

A. Marchant, "Optical Recording: A Technical Overview", Addison–Wesley, Reading, Mass., pp. 172–179, 1990.

*Primary Examiner*—Andrew L. Sniezek
*Assistant Examiner*—Thang V. Tran
*Attorney, Agent, or Firm*—Raymond L. Owens

[57] ABSTRACT

An apparatus and method for providing tracking and focus error signals for controlling an application of a radiation beam to a data track of an optical storage medium. A data signal, indicative of data stored on the medium, may also be provided. One apparatus in accordance with the present invention includes a multi-element beam separator, such as a quad prism, having first, second, third and fourth separator elements for separating a return beam reflected and diffracted from the data track into first, second, third and fourth portions, respectively. In other embodiments, more or less than four separator elements and return beam portions could be used. A focusing lens converges the portions of the return beam onto a detector array. The first and second separator elements, arranged on opposite sides of a plane substantially parallel to a reference plane defined by an optical axis of the radiation beam and a tangent to the data track, separate the return beam along at least one plane substantially parallel to the reference plane, and the resulting first and second portions are used to generate a tracking error signal. The third and fourth separator elements, arranged adjacent to and on opposite sides of the first and second separator elements, separate the return beam along planes substantially perpendicular to the reference plane, and the resulting third and fourth portions are used to generate a focus error signal.

18 Claims, 2 Drawing Sheets

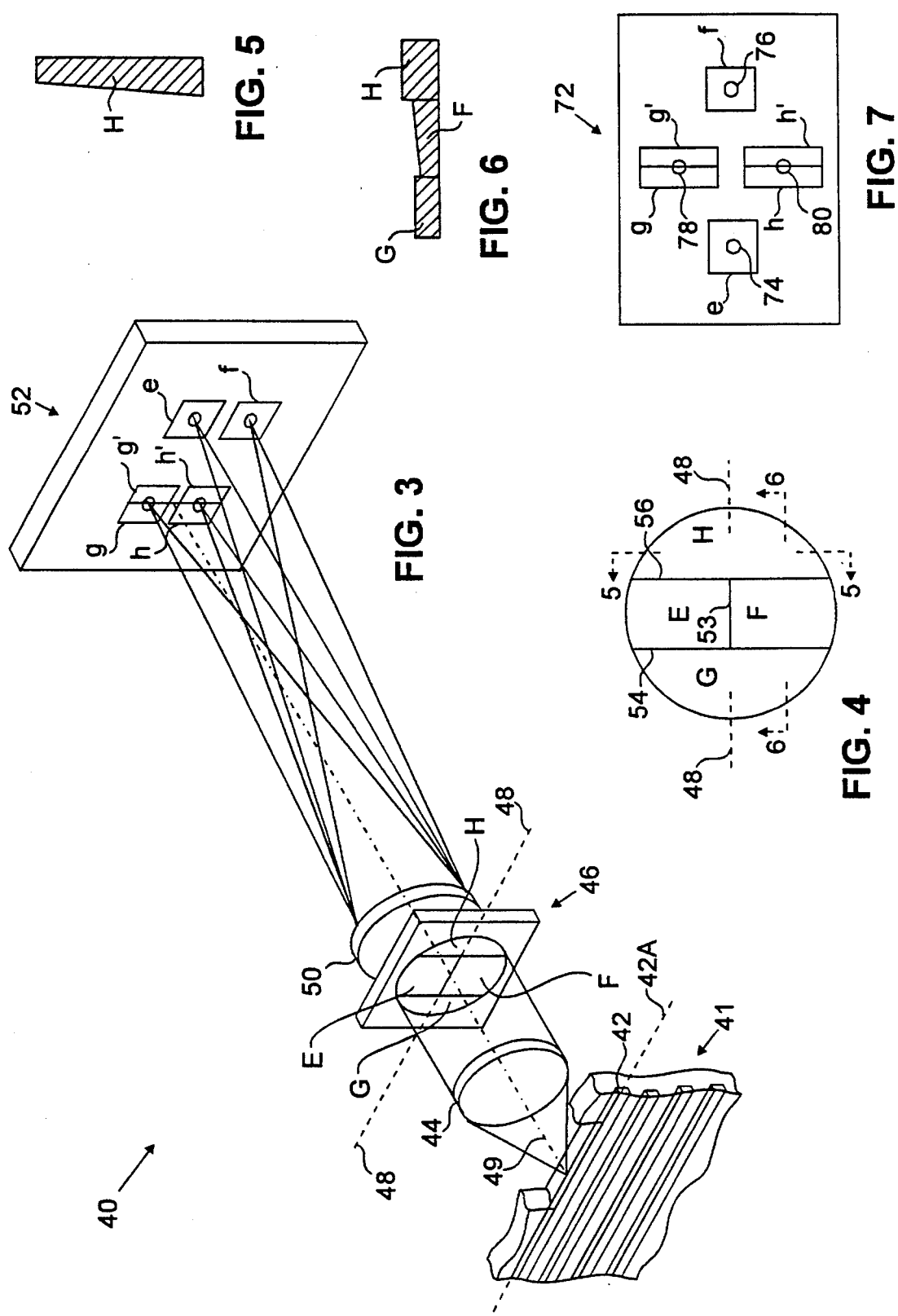

SINGLE RETURN PATH ORTHOGONALLY-ARRANGED OPTICAL FOCUS AND TRACKING SENSOR SYSTEM

CROSS-REFERENCE TO RELATED APPLICATIONS

The present invention is related to the following U.S. Patent Applications: "Apparatus and Method for a Dual Half-Aperture Focus Sensor System," Ser. No. 07/998,179; "Apparatus and Method for a Modified Half-Aperture Focus/Tracking/Data Sensor System," Ser. No. 07/997,809; "Read/Write Laser-Detector-Grating Unit (LDGU) With An Orthogonally-Arranged Focus and Tracking Sensor System," Ser. No. 08/259,428; and "Multi-element Grating Beam Splitter With a Reflection Grating Element For Use in Front Facet Subtraction," Ser. No. 08/259,587, all assigned to the assignee of the present invention. The disclosures of these related Applications are incorporated herein by reference.

1. Field of the Invention

The present invention relates generally to optical heads used in optical information storage and retrieval systems. More particularly, the present invention relates to focus and tracking sensor systems used in optical heads to control the position of a radiation beam relative to an optical storage medium.

2. Description of the Prior Art

FIG. 1 shows an exemplary optical information storage and retrieval system 10 in accordance with the prior art. An optical source 11, such as a laser diode, provides a radiation beam which is collimated by collimating lens 12. The collimated radiation beam is transmitted through a polarization beam splitter 13 and applied to a quarter-wave plate 14. The polarization beam splitter 13 transmits a linear polarization of the radiation beam, such as a p-polarization, and quarter-wave plate 14 provides a circular polarization to the linearly polarized radiation-beam. The circularly polarized radiation beam from the quarter-wave plate 14 is focused by objective lens 15 onto a data track 16B. The data track 16B is on a surface 16A of an optical storage medium 16. The storage medium 16 may be, for example, any optical disk having a surface which interacts with an incident radiation beam.

The interaction with the storage medium surface 16A causes the incident radiation beam to be reflected and diffracted therefrom. The resulting radiation beam, referred to herein as a return beam, is collimated by objective lens 15 and then passes through the quarter-wave plate 14. The quarter-wave plate 14 converts the circular polarized return beam to a linear s-polarized return beam. The linear s-polarization is perpendicular to the p-polarization of the radiation beam transmitted from polarization beam splitter 13. When the s-polarized return beam is applied to the polarization beam splitter 13, it is reflected by a surface 13A of the beam splitter 13. The surface 13A may be, for example, a multilayer coating which transmits p-polarized light and reflects s-polarized light. A focusing lens 17 converges the reflected return beam onto a detector array 18. The detector array 18 detects portions of the return beam which are used to provide, for example, a focus error signal (FES), a tracking error signal (TES), and a data signal. The FES and TES are generally used to drive servo systems for maintaining the radiation beam in-focus and on-track, respectively, relative to the storage medium. The data signal is indicative of the data stored on the data track scanned by the radiation beam. The components of an optical system which process, direct and detect the return beam to provide an FES and a TES, and in some cases also a data signal, may be collectively referred to as a focus and tracking sensor system.

A number of other prior art optical systems split the return beam into two or more beams, each of which is directed to a separate detector array. For example, one detector array may be used to generate a TES and a data signal from one of the beams, while another detector is used to generate an FES from another beam. Such an approach generally requires additional components and therefore increases the size, complexity and cost of the optical system.

Other prior art systems reduce the number of optical components by directing the return beam to an optical beam-separating device such as a dual or four element prism followed by a single detector array. A four element prism will be referred to herein as a quad prism. The FES, TES and data signal are thus all collected using a single return path. Such systems will be referred to herein as single return path systems. An exemplary single return path focus and tracking sensor system is described in M. R. Latta et al., "Effect of Track Crossing on Focus Servo Signals: Feedthrough," SPIE Proceedings, Vol. 1663, Optical Data Storage, 1992. The Latta et al. reference describes a system in which an anamorphic lens, or alternatively a combination of a spherical and a cylindrical lens, is used to direct a single return beam to a quad detector. The quad detector generates an astigmatic FES, a push-pull TES, and a data signal.

Another prior art single return path focus and tracking sensor system is described in U.S. Pat. No. 4,712,205, issued to Smid et al. as assignee of U.S. Philips Corporation. The Smid et al. system provides a dual half-aperture FES, a push-pull TES and a data signal using a single detector array. The return beam is divided by a compound wedge into two separate beams which are directed to two dual element detectors in the single detector array. One significant problem with this system is high cross-talk between the FES and the TES. This and other problems with the Smid et al. system are described in more detail in the above-cited U.S. patent application Ser. No. 07/998,179.

FIG. 2 shows an exemplary implementation of another prior art single return path focus and tracking sensor system 20, described in R. Katayama et al., "Multi-beam magneto-optical disk drive for parallel read/write operation," SPIE Proceedings, Vol. 1078, Optical Data Storage Topical Meeting, Jan. 17–19, 1989. The optical system 20 uses a radiation beam to read and/or write data on a data track 22 of an optical storage medium 21. Only a portion of optical storage medium 21 and data track 22 is shown in FIG. 2. The return beam reflected and diffracted from the data track 22 is collimated by an objective lens 24 and is incident on a quadrant prism 26. A quadrant prism is a type of quad prism in which the four prism elements are arranged as quadrants. The dashed line 22A represents a tangent to data track 22 at a point illuminated by the radiation beam. The dashed line 28 is substantially parallel to the data track 22 and represents a projection of the data track 22 on the quadrant prism 26. The dashed line 29 represents an optical axis of the incident radiation beam. The quadrant prism 26 includes four prism elements A, B, C and D. Each of the prism elements A, B, C and D directs a portion of the return radiation beam from objective lens 24 through a focusing lens 30 to a detector array 32. The detector array 32 includes a number of detector elements a, b, c, c', d and d'. Prism elements A, B, C and D direct four different portions of the return beam toward detector elements a, b, c and c', and d and d', respectively. In the system 20, an FES, a TES and a data signal (DS) are generated from the portions of the return beam incident on the following detector elements:

FES=(c+d')−(c'+d)

TES=a−b

DS=a+b+c+c'+d+d'

The above relationships specify the manner in which signals from the various detector elements are combined to generate the FES, TES and data signal, respectively. It should be noted that certain components present in the system 10, such as the polarization beam splitter 13 and the quarter-wave plate 14, are not shown in system 20 for purposes of clarity.

Depending upon the design of the above-described single return path systems, various amounts of optical cross-talk may originate from, for example, diffracted radiation components and optical wavefront aberrations in the return beam. The presence of optical cross-talk may limit the effectiveness of certain optical systems, particularly those systems which utilize high performance servomechanisms to control focus and tracking of the incident radiation beam. Although the above-cited U.S. patent application Ser. No. 07/998,179 reduces the effect of optical cross-talk by implementing an orthogonality condition between the focus and tracking sensors, it does so using separate optical paths for generating the focus and tracking signals. The need for additional components to create and process separate optical paths adversely affects the cost and complexity of the optical system.

As is apparent from the above, a need exists for optical systems which generate focus and tracking error signals with low optical cross-talk without requiring separate optical paths and additional optical components.

SUMMARY OF THE INVENTION

The present invention provides an apparatus and method for generating focus and tracking error signals in a single return path optical system. In accordance with one aspect of the present invention, an apparatus is provided which includes a multi-element beam separator having first, second, third and fourth separator elements for separating a return beam reflected and diffracted from a data track on a storage medium into first, second, third and fourth portions, respectively. In other embodiments, the multi-element beam separator could include more or less than four elements, and more or less than four portions of the return beam could be used. A focusing lens may be used to converge the portions of the return beam onto a detector array. The first and second separator elements separate the return beam along at least one plane substantially parallel to a reference plane defined by an optical axis of the radiation beam and a tangent to the data track. The resulting first and second portions are detected in first and second detectors, respectively, and may be used to generate a tracking error signal. The third and fourth separator elements, arranged adjacent to and on opposite sides of the first and second separator elements, separate the return beam along planes substantially perpendicular to the reference plane. The resulting third and fourth portions are detected in a third and fourth detector, respectively, and may be used to generate a focus error signal. The apparatus may also be used to generate a data signal indicative of the data stored on the optical medium. The multi-element beam separator may be, for example, a quad prism having first, second, third and fourth prism elements suitably arranged to separate the return beam into the four portions.

In accordance with another aspect of the present invention, a method for providing focus and tracking error signals for controlling an application of a radiation beam to a data track of an optical storage medium is provided. The method includes the steps of separating a return beam resulting from application of the radiation beam to the data track into first, second, third and fourth portions. The first and second portions are separated along at least one plane substantially parallel to a reference plane defined by an optical axis of the radiation beam and a tangent to the data track, and may be used to generate a tracking error signal. The third and fourth portions are separated along planes substantially perpendicular to the reference plane, and may be used to generate a focus error signal. The method may also include the step of converging the first, second, third and fourth portions of the return beam on a detector array including first, second, third and fourth detectors, respectively, which provide signals used to generate the tracking and focus error signals.

The present invention provides advantages in that the focus error signal, tracking error signal and data signal required in many optical systems may be generated with reduced optical cross-talk. The present invention generates these signals using a single return path without the need for additional optical components, and therefore without significantly increasing the cost and complexity of the optical system.

Further features of the invention, its nature and various advantages will become more apparent from the accompanying drawings and the following detailed description of the invention.

BRIEF DESCRIPTION OF THE DRAWINGS

FIG. 3 is an exemplary single return path optical focus and tracking sensor system in accordance with the present invention.

FIG. 4 is a more detailed view of an exemplary quad prism in accordance with the present invention.

FIG. 5 is a cross-sectional view of the exemplary quad prism of FIG. 4 taken along section line 5—5.

FIG. 6 is a cross-sectional view of the exemplary quad prism of FIG. 4 taken along section line 6—6.

FIG. 7 is an alternative embodiment of a detector array suitable for use in the optical system of FIG. 3.

DETAILED DESCRIPTION OF THE PREFERRED EMBODIMENTS

Figure 1:
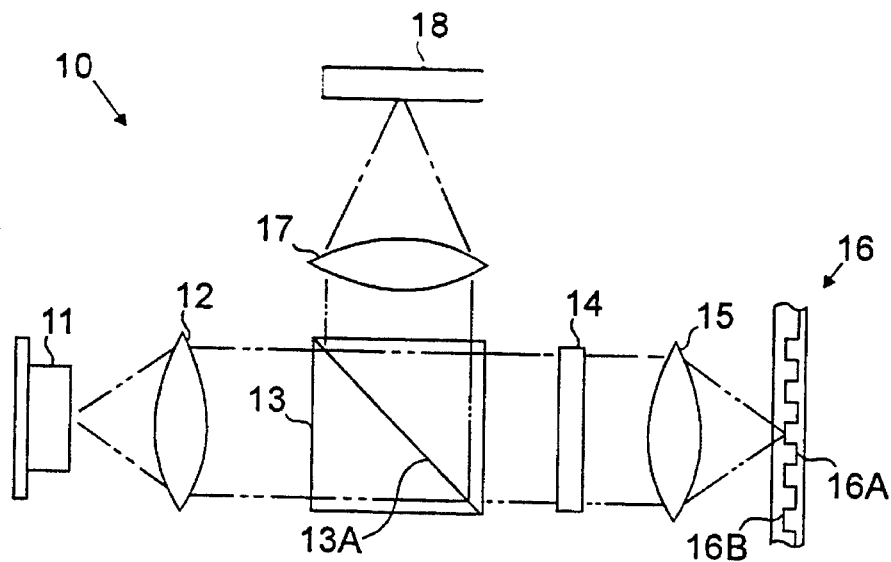
FIG. 1 is an exemplary optical information storage and retrieval system in accordance with the prior art.
Figure 2:
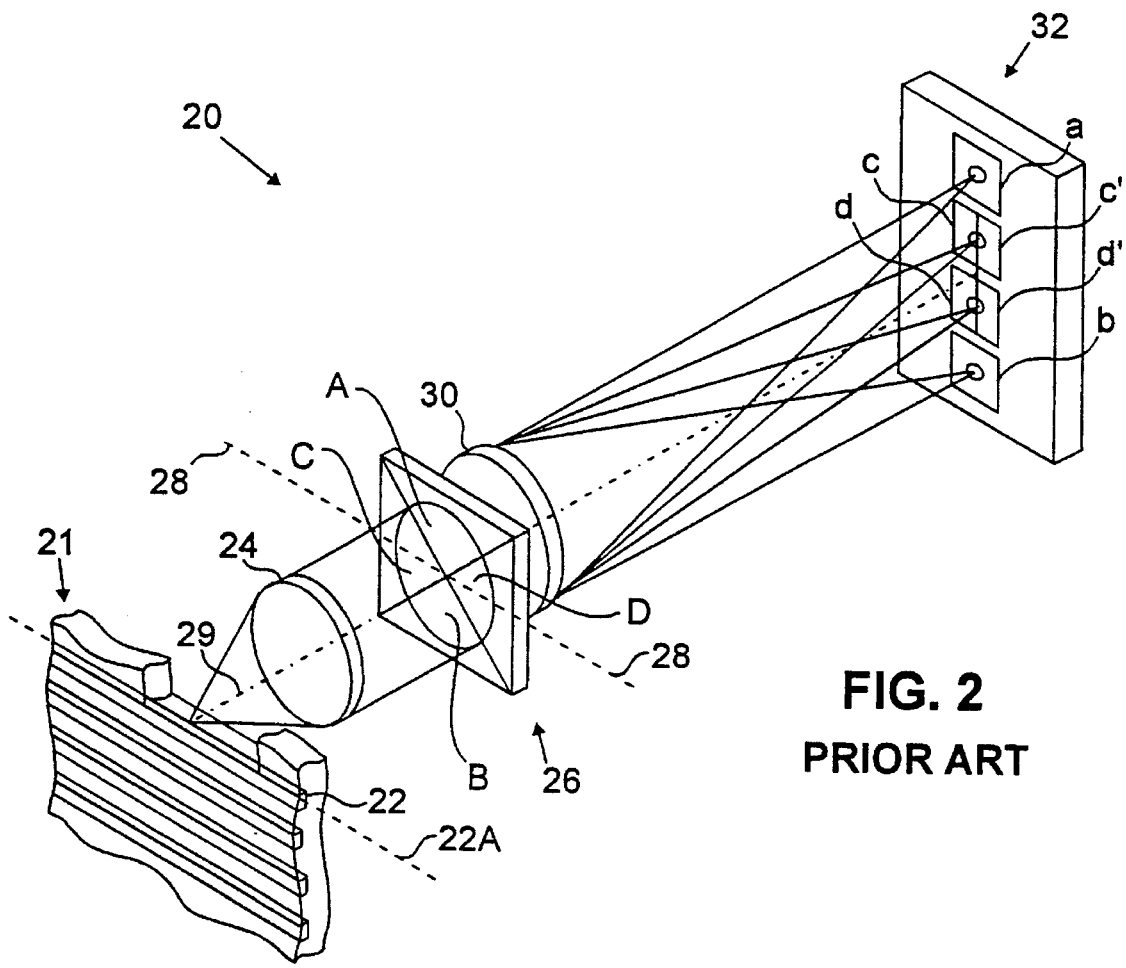
FIG. 2 is an exemplary single return path optical focus and tracking sensor system in accordance with the prior art.

FIG. 3 shows an exemplary single return path focus and tracking sensor system 40 in accordance with the present invention. It should be noted that certain optical system components, such as, for example, a polarization beam splitter and a quarter-wave plate, are not shown but may also be included in the system 40. In addition, the system 40 is generally part of an optical system having a number of other components, such as, for example, an optical source and a collimating lens. The arrangement of FIG. 3 may thus be implemented in any of a number of different optical systems and applications, including, for example, the optical information and retrieval system 10 shown in FIG. 1. A multi-element beam separator in accordance with the present invention could be located, for example, between polarization beam splitter 13 and focusing lens 17, or between lens 17 and detector array 18, in the optical system 10 of FIG. 1.

The exemplary system 40 of FIG. 3 processes a return beam reflected and diffracted from a data track 42. The data track 42 is a diffraction component-generating structure present on the surface of an optical recording medium. The structure diffracts the incident radiation beam because the depth of the structure is generally a fraction of the wavelength of an incident radiation beam and introduces phase differences in the return beam. The term "data track" as used herein includes other diffraction component-generating structures such as, for example, a raised structure or a groove in the storage medium, a region between two grooves in the storage medium, a series of unconnected raised regions, and other optical path structures of appropriate dimension and refractive index such that diffraction patterns are created in response to an incident radiation beam.

The return beam is incident on an objective lens 44 which directs the return beam to a quad prism 46. The exemplary quad prism 46 includes four prism elements E, F, G and H which may be constructed of, for example, glass, plastic, molded glass or molded plastic. The prism elements E, F, G and H separate the return beam into four different portions. In this exemplary embodiment, each of these portions is focused on a different detector in a detector array 52. A focusing lens 50 is arranged between the quad prism 46 and detector array 52 to converge the separated portions of the return beam onto the appropriate detectors in detector array 52. It should be understood that the quad prism 46 having prism elements E, F, G and H may be replaced with other types of multi-element beam separators having corresponding separator elements capable of separating the return beam into a number of distinct portions.

It should be noted that data track 42 is only a portion of a longer data track which is typically arranged in a spiral configuration on the surface of an optical storage medium such as a recordable compact disk (CD). The data track 42 is shown as a straight line in FIG. 3 because the radius of curvature for its corresponding spiral is generally much larger than a given portion of the data track around a point currently illuminated by the incident radiation beam. Such a portion may therefore be considered substantially straight. A projection 48 of data track 42 onto quad prism 46 may also be characterized as substantially parallel to a tangent 42A to the data track 42 at the point currently illuminated by the incident radiation beam. A reference plane is defined by an optical axis 49 of the incident radiation beam and the tangent 42A to the data track 42. The data track 42, projection 48, and the tangent 42A are each substantially perpendicular to the optical axis 49. Elements E and F of quad prism 46 are thus arranged on opposite sides of the reference plane defined by optical axis 49 and tangent 42A. Elements G and H are arranged adjacent to and on opposite sides of elements E and F, and are separated therefrom by planes which are substantially perpendicular to the reference plane.

The detector array 52 includes a first, a second, a third and a fourth detector for detecting the first, second, third and fourth separated portions of the return beam, respectively. The first and second detectors are single element detectors designated in FIG. 3 as detector elements e and f. The third detector is a dual element detector including detector elements g and g'. The fourth detector is a dual element detector including detector elements h and h' Each detector element may be, for example, a photodiode, a group of photodiodes, or another type of optical photodetector. It should be noted that this particular arrangement of detectors is exemplary only. The detectors may include additional detector elements or fewer detector elements in alternative embodiments. In addition, each of the detectors need not be part of a single detector array. As will be discussed in greater detail below, the prism elements and corresponding detector elements are arranged such that the optical cross-talk between focus and tracking signals is minimized.

The return beam generally includes both a reflected component, also referred to as a zeroth order diffracted component, and a number of higher order diffracted components diffracted from the optical storage medium. A given diffraction order generally includes both a positive and a negative diffraction component. Although higher order diffraction components may also be present, the present invention can be readily understood without further consideration of diffraction components greater than first order. When the reflected component overlaps with the first order diffracted components, interference occurs. This interference may be directed to detectors e and f to provide, for example, a push-pull TES. The two first order diffraction components may be, for example, contiguous with an optical axis of the incident radiation beam, and therefore both will overlap with the reflected component. It should be noted, however, that the present invention may be utilized in systems in which the positive and negative diffraction components overlap with each other as well as with the reflected component. Additional detail regarding diffraction components may be found in, for example, the above-cited U.S. patent application Ser. No. 07/998,179, and in pp. 172–179 of A. Marchant, "Optical Recording: A Technical Overview," Addison-Wesley, Reading, Mass., which are incorporated by reference herein.

FIG. 4 shows a portion of the exemplary quad prism 46 of the present invention in greater detail. In the exemplary embodiment shown, the first and second prism elements E and F are arranged on opposite sides of a line 53 which is substantially parallel to data track 42, tangent 42A thereto, and projection 48 thereof, and which lies in the above-defined reference plane. The first and second prism elements separate the return beam into first and second portions, respectively, along at least one plane substantially parallel to the reference plane. The first and second prism elements could also be arranged on opposite sides of a plane parallel to the above-defined reference plane. In addition, the first and second prism elements could be arranged so as to separate the return beam along a first and a second plane, respectively, both of which are substantially parallel to the reference plane. In such an embodiment, the first and second prism elements are not contiguous, as in the embodiment of FIG. 4, but are instead separated by a gap. Any portion of the return beam incident on a gap between the first and second prism elements could be suitably directed, in a well-known manner, onto one or more of the detectors in array 52. The third prism element G is arranged adjacent to and on one side of the first and second prism elements E and F, on one side of a line 54 which is substantially perpendicular to the data track 42, tangent 42A thereto, and projection 48 thereof. The line 54 lies in a plane substantially perpendicular to the above-defined reference plane. The fourth prism element H is arranged adjacent to and on an opposite side of the first and second prism elements E and F, on an opposite side of a line 56 which is substantially perpendicular to the data track 42, tangent 42A thereto, and projection 48 thereof. The line 56 lies in another plane substantially perpendicular to the above-defined reference plane. The third and fourth prism elements separate the return beam into third and fourth portions, respectively, along planes substantially perpendicular to the reference plane.

A tracking error signal (TES) may be generated from the first and second portions of the return beam incident on the first and second detectors e and f of the detector array 52.

The TES is generated in accordance with the relationship e–f, which indicates that the signal generated by detector element f is subtracted from the signal generated by detector element e to provide the TES. The first and second portions, as a result of passing through the above-described quad prism 46, may each include a different diffraction component, such as either a positive or a negative diffraction component, of a given diffraction order, as well as undiffracted components. The diffracted components are those diffracted from the optical storage medium. It should be understood that, in general, only part of any given diffraction component, rather than the entire component, falls within the objective lens aperture and will therefore be incident on quad prism 46. References made herein to a particular diffraction component are thus meant to include any part of that component.

A focus error signal (FES) may be generated from the third and fourth portions of the return beam incident on the third and fourth detectors g, g' and h, h' of the detector array 52. An FES is generated in accordance with the relationship (g+h')−(g'+h), which indicates that the sum of the signals generated by detector elements g' and h is subtracted from the sum of the signals generated by detector elements g and h' to provide an FES. The third and fourth portions, as a result of passing through the above-described quad prism 46, may each include both positive and negative diffraction components of a given diffraction order, as well as undiffracted components. The diffracted components are those diffracted from the optical storage medium. Each of the detector elements g, g', h and h' thus receives both diffraction components of a given diffraction order. By subtracting the signals resulting from detection of the third and fourth portions of the return beam in detector elements g, g' and h, h', respectively, the diffraction components of a given diffraction order substantially cancel out, thereby reducing optical cross-talk.

A data signal, indicative of the data stored on data track 42, may also be generated in the optical system 40. For example, a data signal could be generated by combining the signals generated by each detector element in the detector array 52, in accordance with the relationship e+f+g+g'+h+h'. Alternatively, signals from a subset of detector elements could be combined to generate a data signal.

System 40 may also include electronic circuitry (not shown) for combining signals generated by the detector elements of array 52. The electronic circuitry may include adders, subtracters or other types of signal combiners for generating focus error, tracking error, and data signals in accordance with the above-described relationships. Such electronic circuitry is generally well-known in the art and will therefore not be further described herein.

As noted above, the arrangement of prism elements shown in FIGS. 3 and 4 is exemplary only, and alternative embodiments of the present invention may utilize other arrangements. For example, the various elements of the prism 46 may be separated by lines which deviate from the parallel or perpendicular lines shown in FIG. 4 by up to about ten percent. The terms "substantially parallel" and "substantially perpendicular", as used herein, include deviations of at least ten percent from parallel and perpendicular, respectively. Although the amount of optical cross-talk may increase as a result of such deviations, an improvement over most current prior art systems would generally still be obtained. In addition, although the separator elements E, F, G and H are generally shown in FIGS. 3 and 4 as contiguous portions of a circular multi-element prism, in other embodiments these elements could be arranged in a variety of other ways. For example, contiguous elements could be separated and any resulting gaps filled with an opaque material, although part of the return beam may be lost in such an arrangement. Furthermore, although a four element beam separator is preferred in many applications, a multi-element beam separator in accordance with the present invention may include either more or less than four separator elements. For example, in an embodiment which does not use a data signal, an alternative multi-element beam separator could include only the elements E, F and G, or E, F and H. In an embodiment which uses a data signal, the elements E and F could be modified in size and shape to also receive the portion of the return beam which would otherwise fall on the removed element, such that the entire return beam is still incident on the detector array. A beam separator with additional elements could be suitably arranged to separate the return beam into portions which, when detected, generate signals which may be combined in accordance with the present invention such that optical cross-talk is minimized. One skilled in the art could readily modify the multi-element beam separator 46, detector array 52, and the above-described relationships for generating an FES, a TES and a data signal, to accommodate such alternative embodiments.

FIG. 5 shows a cross-sectional view of the exemplary quad prism 46 taken along the section line 5—5 of FIG. 4. This cross-sectional view shows that the fourth prism element H may include an outer surface sloping in one direction. The outer surface of a given prism element refers to a surface on which the return beam is incident before it is separated by the prism. An inner surface refers to a surface exited by a separated portion of the return beam. The third prism element G may include an outer surface sloping in a direction opposite that of the outer surface of fourth prism element H. These sloping surfaces allow the quad prism 46 to direct the third and fourth portions of the return beam toward the detectors g, g' and h, h' on detector array 52.

FIG. 6 shows a cross-sectional view of the exemplary prism 46 taken along the section line 6—6 of FIG. 4. This cross-sectional view shows that the second prism element F may include an outer surface sloping primarily in one direction. The first prism element E may include an outer surface sloping primarily in the same direction as the outer surface of second prism element F. The outer surfaces of first and second prism elements E and F also slope in other directions. These sloping surfaces allow the prism 46 to direct the first and second portions of the return beam toward the detectors e and f on detector array 52. It should be understood that the prism element surfaces shown in FIGS. 5 and 6 are exemplary only, and are arranged as shown in order to direct the separated portions of the return beam to an appropriate detector in detector array 52. In other embodiments these surfaces may be modified to provide any of a number of alternative arrangements without deviating from the teachings of the present invention. For example, the direction, amount and type of slope may be varied, or an inner surface rather than an outer surface of a given prism element could be shaped so as to suitably direct the return beam. One skilled in the art could readily determine appropriate dimensions, refractive indices, and other parameters for any number of different prism elements, or more generally beam separator elements, suitable for use in the present invention.

FIG. 7 shows an alternative detector array 72 suitable for use with the present invention. Each of the portions of the return beam separated by the prism elements of the prism 46 are focused onto a different detector of the detector array 72 using focusing lens 50 or another suitable focusing device.

Exemplary focus spots 74, 76, 78 and 80 indicate an area of each detector on which the first, second, third and fourth return beam portions, respectively, may be focused when the incident radiation beam is on-track and in-focus relative to the optical storage medium. The detector array 72 includes first, second, third and fourth detectors for detecting the first, second, third and fourth portions of the return beam, respectively. The first and second detectors include single detector elements e and f, respectively. The third and fourth detectors are dual element detectors including detector element pairs g, g' and h, h', respectively. In this embodiment, as in the detector array 52 of FIG. 3, the division between the detector element pairs g, g' and h, h' is along a line substantially perpendicular to the reference plane defined by optical axis 49 and tangent 42A to data track 42. The first and second detector elements e and f are arranged on opposite sides of the detector array 72, rather than on the same side as in detector array 52 of FIG. 3. The sloping surfaces of prism elements E and F could be readily modified in a well-known manner to direct the first and second portions of the return beam to detectors e and f, respectively, of array 72.

In general, the orientation and location of the detector elements e and f is not critical to the operation of the present invention, and the arrangements in FIGS. 3 and 7 or other alternative arrangements may be chosen in order to satisfy detector array packaging constraints or other criteria. The position of the third and fourth detectors g, g' and h, h' may also be varied but the division between the pairs should generally be oriented in a direction substantially perpendicular to the reference plane.

Although the foregoing detailed description has described the present invention primarily in terms of an illustrative optical information storage and retrieval system, it should be understood that the embodiments described are exemplary only. Many variations may be made in the arrangements shown, including, for example, the type of optical device used to separate the return beam and the arrangement, shape and number of separating elements, the number of portions into which the return beam is separated, the arrangement of detectors and detector elements onto which the portions of the return beam are focused, and the type and arrangement of optical components for directing the incident and return radiation beams in the optical system. These and other alternatives and variations will be readily apparent to those skilled in the art, and the present invention is therefore limited only by the appended claims.

| PART LIST | |
|---|---|
| A, B, C, D, E, F, G, H | prism elements |
| a, b, c, c', d, d', e, f, g, g', h, h' | detectors |
| 10 | optical system |
| 11 | optical source |
| 12 | collimating lens |
| 13 | polarization beam splitter |
| 13A | surface |
| 14 | quarter-wave plate |
| 15 | objective lens |
| 16 | optical storage medium |
| 16A | optical storage medium surface |
| 16B | data track |
| 17 | focusing lens |
| 18 | detector array |
| 20 | focus and tracking sensor system |
| 21 | optical storage medium |
| 22 | data track |
| 22A | tangent to data track |
| 24 | objective lens |
| 26 | quadrant prism |
| 28 | projection |
| 29 | optical axis |
| 30 | focusing lens |
| 32 | detector array |
| 40 | focus and tracking sensor system |
| 41 | optical storage medium |
| 42 | data track |
| 42A | tangent to data track |
| 44 | objective lens |
| 46 | quad prism |
| 48 | projection |
| 49 | optical axis |
| 50 | focusing lens |
| 52 | detector array |
| 53, 54, 56 | lines |
| 74, 76, 78, 80 | focus spots |

What is claimed is:

1. An apparatus for providing tracking and focus error signals for controlling an application of a radiation beam to a data track of an optical storage medium, said apparatus comprising:

a multi-element prism having at least a first separator element, a second separator element and a third separator element, with at least one of the separator elements having a linearly-sloped beam-directing surface, the multi-element prism adapted to separate a return beam resulting from said application of said radiation beam to said data track into at least a first portion, a second portion and a third portion, respectively, such that said first and said second separator elements separate said return beam along at least one plane substantially parallel to a reference plane defined by an optical axis of said radiation beam and a tangent to said data track, and said third separator element, arranged adjacent to and on one side of the first and second separator elements, separates said return beam along a plane substantially perpendicular to said reference plane;

a first detector to detect said first portion of said return beam;

a second detector to detect said second portion of said return beam; and a third detector to detect said third portion of said return beam.

2. The apparatus of claim 1 further including:

a fourth separator element in said multi-element prism arranged adjacent to said first and second separator elements on a side opposite said third separator element, and having a linearly-sloped beam-directing surface to separate a fourth portion of said return beam along another plane substantially perpendicular to said reference plane; and a fourth detector to detect said fourth portion of said return beam.

3. The apparatus of claim 2 wherein said third and said fourth detectors are used to generate said focus error signal from said third and said fourth portions of said return beam.

4. The apparatus of claim 3 wherein said third detector includes detector elements g and g', said fourth detector includes detector elements h and h', and said focus error signal is generated in accordance with the relationship $(g+h')-(g'+h)$.

5. The apparatus of claim 2 wherein said third and said fourth portions of said return beam each include both a positive and a negative diffraction component of a given diffraction order.

6. The apparatus of claim 2 wherein said first detector includes a detector element e, said second detector includes a detector element f, said third detector includes detector elements g and g', and said fourth detector includes detector elements h and h', and said apparatus further provides a data signal indicative of data stored on said data track in accordance with the relationship e+f+g+g'+h+h'.

7. The apparatus of claim 2 wherein said third and said fourth detectors each include two detector elements divided along a line perpendicular to said reference plane.

8. The apparatus of claim 1 wherein said first and said second portions of said return beam each include a different diffraction component of the same diffraction order.

9. The apparatus of claim 1 wherein said first and said second detectors are used to generate said tracking error signal from said first and second portions of said return beam.

10. The apparatus of claim 9 wherein said first detector includes a detector element e and said second detector includes a detector element f and said tracking error signal is generating in accordance with the relationship e–f.

11. The apparatus of claim 1 further including:

a detector array including said first detector, said second detector and said third detector; and a focusing lens arranged between said multi-element prism and said detector array to converge said portions of said return beam on said detectors.

12. A method for providing tracking and focus error signals for controlling an application of a radiation beam to a data track of an optical storage medium, said method comprising the steps of:

separating a return beam resulting from said application of said radiation beam to said data track into at least a first portion, a second portion and a third portion using first, second and third separator elements, respectively, of a multi-element prism, wherein at least one of the separator elements has a linearly-sloped beam-directing surface, such that said first and said second portions are separated along at least one plane substantially parallel to a reference plane defined by an optical axis of said radiation beam and a tangent to said data track, and said third portion is separated along a plane substantially perpendicular to said reference plane; and detecting said first portion, said second portion and said third portion of said return beam in a first detector, a second detector and a third detector, respectively.

13. The method of claim 12 wherein said step of separating said return beam further includes separating a fourth portion of said return beam along another plane substantially parallel to said reference plane, using a fourth separator element in said multi-element prism, and said step of detecting further includes detecting said fourth portion in a fourth detector.

14. The method of claim 13 further including the steps of:

generating said tracking error signal from said first and second portions of said return beam detected in said first and said second detectors, respectively; and generating said focus error signal from said third and said fourth portions of said return beam detected in said third and said fourth detectors, respectively.

15. The method of claim 14 wherein said step of detecting said first and said second portions of said return beam in said first and said second detectors, respectively, further includes detecting said first portion in a detector element e, and said second portion in a detector element f, and wherein said step of generating said tracking error signal further includes the step of generating said tracking error signal in accordance with the relationship e–f.

16. The method of claim 14 wherein said step of detecting said third and said fourth portions of said return beam in said third and said fourth detectors, respectively, further includes detecting said third portion in a dual element detector having detector elements g and g' and said fourth portion in a dual element detector having detector elements h and h', and wherein said step of generating said focus error signal includes generating said focus error signal in accordance with the relationship (g+h')–(g'+h).

17. The method of claim 12 further including the step of converging said portions of said return beam on a detector array including said first detector, said second detector and said third detector.

18. A multi-element prism for separating a return beam, resulting from application of a radiation beam to a data track of an optical storage medium, into a number of portions, said prism comprising:

a first separator element to separate a first portion of said return beam, said first separator element arranged on one side of a plane substantially parallel to a reference plane defined by an optical axis of said radiation beam and a tangent to said data track;

a second separator element to separate a second portion of said return beam, said second separator element arranged on an opposite side of said plane substantially parallel to said reference plane, said first and said second separator elements separating the return beam along said plane substantially parallel to the reference plane;

a third separator element to separate a third portion of said return beam; and a fourth separator element to separate a fourth portion of said return beam, said third and said fourth separator elements arranged adjacent to and on opposite sides of said first and said second separator elements, and separating the return beam along planes substantially perpendicular to said reference plane;

wherein at least one of said first, second, third and fourth separator elements has a linearly-sloped beam-directing surface.

* * * * *